J. OAKLEY.
BROACH.
APPLICATION FILED JULY 9, 1919.

1,359,832.

Patented Nov. 23, 1920.

INVENTOR.
John Oakley,
BY
Frank A. Cutter,
ATTORNEY.

UNITED STATES PATENT OFFICE.

JOHN OAKLEY, OF SPRINGFIELD, MASSACHUSETTS.

BROACH.

1,359,832.   Specification of Letters Patent.   Patented Nov. 23, 1920.

Original application filed June 25, 1918, Serial No. 241,748. Divided and this application filed July 9, 1919. Serial No. 309,599.

*To all whom it may concern:*

Be it known that I, JOHN OAKLEY, a subject of the King of Great Britain, residing at Springfield, in the county of Hampden and State of Massachusetts, have invented a new and useful Broach, of which the following is a specification.

My invention relates to improvements in tools of the drift or broach type, which are used to cut grooves, channels, slots, and the like in various objects, and consists essentially of a shank provided with teeth, and having depressed surface, chip-clearance passages opening at the rear end, such teeth overhanging such passages together with such other parts and members as may be needed or desired to render the tool complete and serviceable in all respects, all as hereinafter set forth.

This application is a divisional part of my application for patent of the United States, Serial No. 241,748.

With this broach the original slot in the stock may be cut or a slot previously cut may be widened, according to the manner in which my invention is applied and the tool used.

The primary object of my invention is to produce a broach for cutting slots, in which there is employed clearance for the chips, so that clogging is prevented and there is no liability of injuring, by chipping, slivering, or tearing the stock.

With a tool embodying my invention I am able to broach a wide slot with great accuracy and high finish, and in less time than is commonly required for the same work performed with the old type of broaching tool.

Another object is to provide a broach which is strong and durable, comparatively inexpensive to construct, and withal highly practicable and efficient.

Other objects and advantages will appear in the course of the following description.

I attain the objects and secure the advantages of my invention by the means illustrated in the accompanying drawings, in which—

Figure 1:
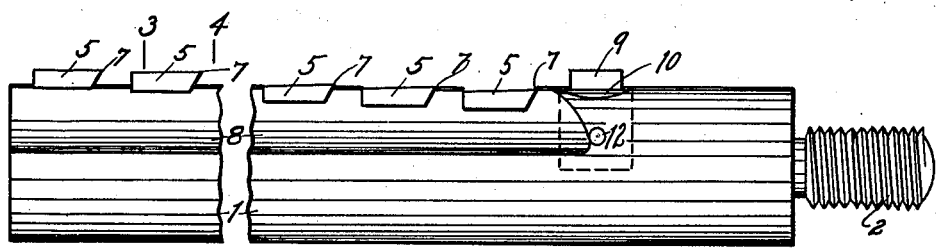
Figure 3:
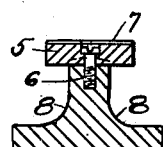
Figure 2:
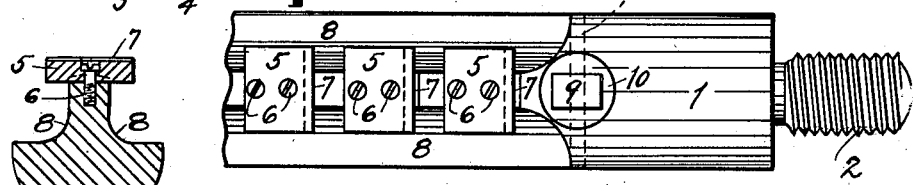
Figure 5:
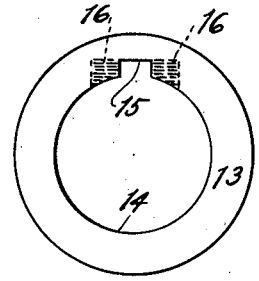
Figure 4:
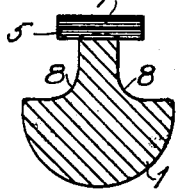
Figure 6:
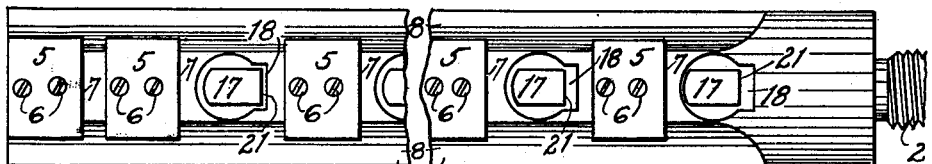
Figure 7:
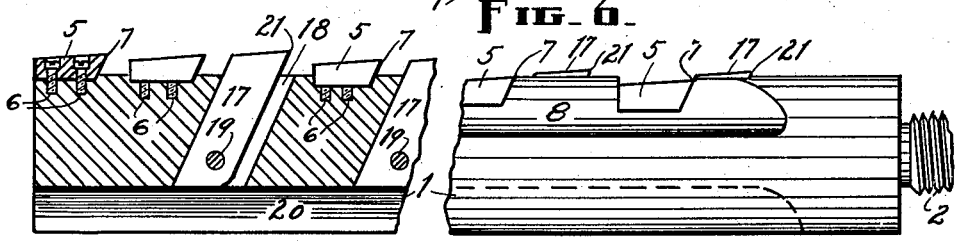

Figure 1 is a side elevation of a broach which embodies a practical form of my invention, the middle portion of said broach being broken out in this view and in Figs. 6 and 7 to economize space; Fig. 2, a top plan of the front-end portion of said broach; Fig. 3, a cross section through said broach, taken on lines 3—3, looking in the direction of the associated arrow in Fig. 1; Fig. 4, a cross section through the broach, on lines 4—4, looking in the same direction as before, Fig. 1; Fig. 5, an end elevation of a piece of stock, illustrating the operation or purpose of said broach; Fig. 6, a top plan of a broach which embodies another practical form of said invention, and Fig. 7, a combined side elevation of and central, longitudinal, vertical section through said last-named broach.

Similar reference characters designate similar parts throughout the several views.

It should be noted in passing that the diameter of each shank of the broach is the same as that of the main passage through the stock, and the width of each tooth or of each wide tooth in a broach having wide and narrow teeth is equal to that of the slot to be cut, whether original or widened, in said stock. The heights or radial depths of the teeth of either of these broaches increase from front to rear, as is the case with the teeth of ordinary broaches.

Usually the teeth will be attachable to and detachable from rather than integral with the shank. In the event the broach is designed to widen a slot already cut, said broach is preferably provided with a pilot or equivalent means for guiding the teeth.

In the matters of shape, size, arrangement, and construction of the parts of my invention, it is to be understood that other modifications, in addition to those illustrated in connection herewith, may be made without departing from the nature of said invention or exceeding the scope of what is claimed, wherefore I do not desire or intend to be restricted to the two embodiments herein shown and described in detail.

Referring to the drawings, I will first describe the broach illustrated in the first four views, which is a widening tool, but may be used for the original or initial cutting of a wide slot, as will presently be more clearly explained, and then describe the broach in Figs. 6 and 7, which is equipped with narrow and wide teeth for cutting a wide slot in the stock in the first instance, and this without undue strain on the tool or injurious action on the stock.

I desire, first, to call attention to the fact that each broach comprises a shank 1, which is provided at the forward or leading terminal with suitable means for attaching said broach to the machine, as a screw-threaded puller-head 2, the same being partly broken off in Figs. 6 and 7, and a plurality of teeth, which latter are radially-cutting in the examples herein shown.

Although I show "radially-cutting" teeth my invention is not necessarily confined to the same.

Mounted on the shank 1 of the first broach, which is the broach of Figs. 1, 2, 3, and 4, is a row of flat, rectangular teeth 5, each secured to said shank by two screws 6. The front edge of each tooth 5 is undercut or beveled from the outside inward and rearward to form of the front, outer edge of said tooth a cutting edge 7. Two longitudinal chip-clearance passages or channels 8 are formed in the shank 1, one on each side of that part of said shank to which the teeth 5 are directly secured by the screws 6. The channels 8 are cut into the side of the shank and extend from points in advance of the transverse plane of said shank in which is located the foremost cutting edge 7 to the rear end of said shank, through which end said channels open. The teeth 5 overhang the channel 8 on both sides. Said teeth, as shown, are all of the same thickness and let into the shank 1 in such a manner as to obtain the stepped arrangement required in broaching, the foremost tooth being set in the most, the next being set in not quite so far, the third less, and so on, the rearmost tooth being set in the least of all. A pilot 9, of the same width and depth as the width and depth of the slot which this tool is designed to widen, is located on the shank 1 in advance of the row of teeth 5 and in the central, longitudinal plane of said row. The pilot is formed on the outer end of a plug 10 which fits within a recess in the shank, and is secured therein by a transverse pin 12 passing through said shank and plug. The central portions of the cutting edges 7, which are in direct line with the pilot 9, do no cutting, but the outlying portions of said edges cut away the stock to widen the original slot. It is plainly to be seen, then, that the chips cut by the teeth 5 must pass directly into the channels 8 and through the latter to escape at the rear end of the shank. That part of the shank 1 which directly supports the teeth 5 is no wider that the pilot 9, consequently there is nothing to divert the chips from their courses against the beveled front edges of said teeth, as soon as said chips are cut, and into the channels 8. The outer faces of the teeth 5 are beveled slightly for clearance as usual, and the same thing is true of the teeth in the other example of broach shown in connection herewith.

Assuming now that a piece of stock 13, Fig. 5, has a central opening or passage 14 and a slot 15 therethrough, which slot it is desired to widen, and that the shank 1 of the broach just described will fit said passage and the pilot 9 of said broach will fit said slot, while the width of the teeth of said broach corresponds with the width of the required slot, and the depth of the rearmost tooth is equal to the depth of the slot, the operation of widening is as follows: The forward end of the shank 1 is introduced into the passage 14 and the pilot 9 into the slot 15, and the tool is drawn forcibly through said slot, with the result that the cutting edges 7 or the portions thereof that overhang the channels 8 progressively cut away the inner periphery of the stock both sides of said slot, as indicated by broken lines in Fig. 5, forming first the inner corners of the enlarged or widened slot and working radially or outwardly until finally the wide slot complete is produced. Owing to the fact that the first few cuts in the widening operation are on chords of the opening 14, the teeth 5 which make said cuts must be depressed so much that their cutting edges 7 are below the periphery of the shank 1.

The pilot 9 leads and the teeth 5 follow and cut the slot the full width and deeper and deeper the farther the tool progresses, as is clearly apparent. The chips cut by the teeth 5 on both sides of the slot are directed by the beveled front edges of said teeth into the passages or channels and finally off at the back end of the tool.

Passing next to the second broach, that shown in Figs. 6 and 7, it will be seen that this broach has alternately arranged narrow teeth 17 and wide teeth 5. By providing the broach with the narrow and wide teeth, I am able to cut a wide slot with the single tool expeditiously, accurately, and with comparative ease. The teeth 17 are received in transverse passages 18 in the shank 1, they are secured with transverse pins 19, and said passages open at one end through the top or one side of said shank, and at the outer end into a longitudinal passage 20 in said shank, all as fully set forth in United States Letters Patent No. 1,272,841, while the teeth 5 are mounted on the shank and secured with the screws 6, as in the first instance. The teeth 17 have cutting edges 21 at the outer end of their front edges. One of the teeth 17 leads, then follow in a row the teeth 5 and 17 arranged alternately, until the rear end of the shank is reached where there are two teeth 5 instead of only one. The cutting edge 7 of each tooth 5, with the exception of the cutting edge of the rearmost tooth 5, projects less than the cutting edge 21 of the tooth 17 immediately in front, for the reason that, during the first part of the cutting operation the chord in the bore of the stock which corresponds with or represents the width of the cut of the wide tooth is longer than the chord in said bore which corresponds with or represents the width of the cut of the narrow tooth. If the first narrow and the first wide cutting edges were on the same plane parallel with the longitudinal center of the shank, the second narrow and the second wide cutting edges on the same plane parallel with the said center, and so on, the wide cutting edges might be required to make cuts which would be too deep to be practicable. The difference in depth of cut between each narrow tooth and the wide tooth immediately behind is compensated for by the addition of the extra, wide tooth at the rear end, which tooth has a cutting edge that is level with the cutting edge of the rearmost narrow tooth.

When the second broach is in use the foremost tooth 17 first makes a narrow cut in the stock, then the foremost tooth 5 makes a wide cut which is nearer the axial center of the shank than is the initial cut, next the second tooth 17 cuts a little deeper the width of its cutting edge, likewise the second tooth 5, and so on until finally the last tooth 5 removes the stock remaining in the slot after the last tooth 17 and the next to the last tooth 5 have made their cuts, and leaves the innermost wall of the slot smooth and regular clear across. Progressively and alternately the teeth of this broach cut out the central and lateral portions of the slot until the latter is completed throughout its entire length.

The cutting edge 21 of each tooth 17 projects a trifle less than such edge of the tooth 17 immediately behind, of course, and so, also, with the associated teeth 5 and their cutting edges 7.

Although the lands between the channels 8 in which the teeth 17 are located extend under or beyond the inner edge portions of the chips cut by the teeth 5 said chips readily pass over such lands into said channels, owing to the fact that the lands are convex and considerable portions of said teeth extend over said channels.

It is an advantage to employ attachable and detachable teeth, and an attachable and detachable pilot where used, not only because it is frequently less expensive to construct a broach with such attachable and detachable members, but on account of the fact that such members when damaged or broken can be taken out, repaired, and replaced, or replaced with new ones, without being obliged to discard the entire broach. The manner of removing and replacing any of the teeth and the pilot will be readily understood from the drawings and hereinbefore given description.

It is also plain that it is necessary to provide the depressed-surface, clearance passages or channels within or inside of the major diameter and opening at the rear end of the shank, for the chips cut by the front edges of the teeth, in each case.

What I claim as my invention, and desire to secure by Letters Patent, is—

1. A broach comprising a shank having longitudinal channels formed in the periphery and opening at the rear end of said shank, and a row of teeth mounted on that part of said shank which is between said channels, and extending over the latter.

2. A broach comprising a shank having longitudinal channels formed in the periphery and opening at the rear end of said shank, and alternately arranged narrow and wide teeth mounted on said shank, the wide teeth extending over said channels.

3. A broach comprising a longitudinally channeled shank and a row of teeth mounted on and extending over the channeled portion of said shank.

4. A broach comprising a shank, and teeth separate from said shank, and means to attach said teeth to said shank, the latter having depressed surface clearance passages within the major diameter and opening at the rear of said shank, to receive the chips cut by said teeth, and said teeth extending over such passages.

JOHN OAKLEY.

Witnesses:
 F. A. CUTTER,
 A. C. FAIRBANKS.